US005929887A

United States Patent [19]

Huang

[11] Patent Number: 5,929,887

[45] Date of Patent: Jul. 27, 1999

[54] LOW COST FIELD EMISSION BASED PRINT HEAD

[75] Inventor: Jammy Chin-Ming Huang, Taipei, Taiwan

[73] Assignee: Industrial Technology Research Institute, Hsin-Chu, Taiwan

[21] Appl. No.: 09/088,441

[22] Filed: Jun. 1, 1998

Related U.S. Application Data

[62] Division of application No. 08/668,794, Jun. 24, 1996, Pat. No. 5,785,873.

[51] Int. Cl.[6] .............................. B41J 2/435; H04N 1/23

[52] U.S. Cl. .......................... 347/122; 347/238; 313/494

[58] Field of Search ................................ 345/11, 60, 74; 347/120, 122, 237, 238; 313/494, 495; 216/11; 445/24, 25; 358/507; 438/20

[56] References Cited

U.S. PATENT DOCUMENTS 4,794,062 12/1988 Oka et al. ................................ 430/31
5,012,279 4/1991 Nakajima et al. ........................ 399/31
5,015,912 5/1991 Spindt et al. .......................... 313/495
5,112,709 5/1992 Yamazaki et al. ........................ 430/46
5,153,483 10/1992 Kishino et al. ............................ 315/3
5,229,331 7/1993 Doan et al. ............................... 438/20

*Primary Examiner*—N. Le
*Assistant Examiner*—L. Anderson
*Attorney, Agent, or Firm*—George O. Saile; Stephen B. Ackerman

[57] ABSTRACT

A photoprinter is described, including a print head comprising three parallel substrates, with the space between them being permanently evacuated. The middle substrate is divided into left and right parts with a space left between them. Suitable gettering means is located inside said space. The right side of the middle substrate supports a unilinear or trilinear array (for monochrome and color respectively) of microtips that rest on cathode columns. Gate lines, orthogonally disposed relative to the cathode columns are located at the top level of the microtips and have openings through which the microtips can emit electrons, due to field emission, which bombard nearby conductive phosphor layers, thereby emitting light. Microtips and phosphor layers are placed close together so that proximity focusing of the electrons is adequate. This allows the print head to be placed close to the surface of a rotatable photosensitive drum. A method for manufacturing the print head is described.

8 Claims, 3 Drawing Sheets

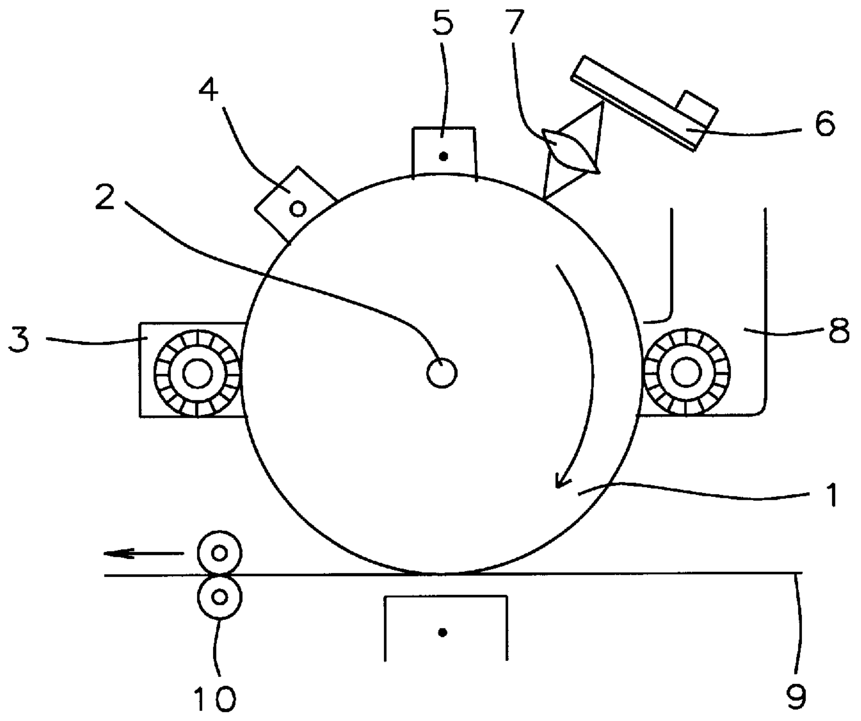
FIG. 1 – Prior Art
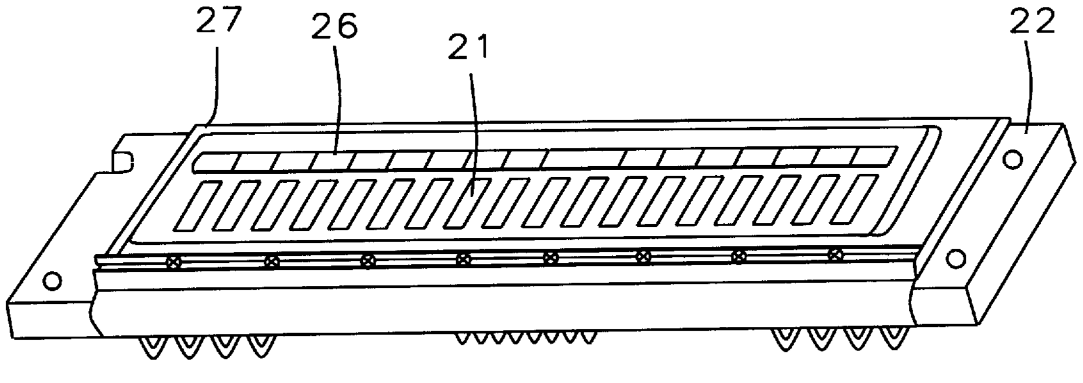
FIG. 2 – Prior Art

LOW COST FIELD EMISSION BASED PRINT HEAD

This is a division of patent application Ser. No. 08/668,794, filing date Jun. 24, 1996, Low Cost Field Emission Based Print Head, assigned to the same assignee as the present invention, now U.S. Pat. No. 5,785,873.

BACKGROUND OF THE INVENTION (1) Field of the Invention

The invention relates to the general field of photoprinters, more particularly to print heads based on field emission devices.

(2) Description of the Prior Art

FIG. 1 is a schematic illustration of a typical photoprinter of the prior art as described by, for example, Oka et al. (U.S. Pat. No. 4,794,062 Dec. 1988). An electrostatic drum 1, having a cylindrical shape and seen end-on in the figure, is capable of rotation about an axis 2. With the drum rotating in clock-wise direction (in this example) the photoprinting process begins with a mechanical cleaning of the drum surface by suitable mechanism 3 such as, for example, a scraper blade.

The freshly cleaned surface is then exposed to electrostatic discharge unit 4 following which it receives a uniform electrostatic charge from charging unit 5. The charged surface now passes beneath light image source 6, said light being focused onto the drum by focusing means 7. Most commonly, light image source 6 is an array of light emitting diodes (LEDs).

Wherever light from source 6 strikes the drum's surface, the local electrostatic charge is neutralized so that a charged negative image of the pattern formed by the LEDs remains on the drum's surface. As the drum continues its rotation, it passes toner dispenser 8 where toner is electrostatically attracted to said charged image. Finally, toner is transferred, with little or no loss of image quality, to paper 9 which is being pulled past the drum by rollers 10.

A closeup view, in isometric projection, of a typical LED print head is shown in FIG. 2. The actual light source is linear array 26 of LEDs. These are driven by Integrated Circuits (ICs) such as 21. Excess heat is removed through heat sink 22. The entire array is protected by means of glass cover 27. Print heads of this type are relatively expensive and it is difficult to assemble LEDs very close to one another so as to be able to produce high density, high quality printing.

Cold cathode electron (or field) emission devices (FEDs) are based on the phenomenon of high field emission wherein electrons can be emitted into a vacuum from a room temperature source if the local electric field at the surface in question is high enough. The creation of such high local electric fields does not necessarily require the application of very high voltage, provided the emitting surface has a sufficiently small radius of curvature.

The advent of semiconductor integrated circuit technology made possible the development and mass production of arrays of cold cathode emitters of this type. In most cases, cold cathode field emission displays comprise an array of very small conical emitters, or microtips, each of which is connected to a source of negative voltage via a cathode conductor line or column. Another set of conductive lines (called gate lines) is located a short distance above the cathode columns and is orthogonally disposed relative to them, intersecting with them at the locations of the microtips, and connected to a source of positive voltage. Both the cathode and the gate line that relate to a particular microtip must be activated before there will be sufficient voltage to cause cold cathode emission. In a linear device, the gate is always activated and emission is controlled by the cathode, making for a simpler structure.

The electrons that are emitted by the cold cathodes accelerate past openings in the gate lines and strike a conductive phosphor screen that is located a short distance from the gate lines. In general, a significant number of microtips serve together as a single pixel (or subpixel in the case of color displays) for the total display. Note that, even though the local electric field in the immediate vicinity of a microtip is in excess of 1 million volts/cm., the externally applied voltage is only of the order of 100 volts.

Field emission displays are normally intended for human viewing rather than as light sources in photoprinters. We are unaware of any prior art that discloses their use as print heads or similar application.

SUMMARY OF THE INVENTION

It has been an object of the present invention to provide a print head, for a photoprinter, that is cheap to manufacture while still offering good resolution and reliability.

Another object of the present invention is to provide a print head based on Field Emission Display technology.

Yet another object of the present invention is to provide a design for a FED based print head that employs proximity focusing while at the same time providing sufficient room for the inclusion of suitable gettering means.

An additional object of the present invention is provide both monochrome and color print heads.

A still further object of the present invention is to provide a method for manufacturing said print heads.

These objects have been achieved by the provision of a print head comprising three parallel substrates, with the space between them being permanently evacuated. The middle substrate is divided into left and right parts with a space left between them. Suitable gettering means is located inside said space. The right side of the middle substrate supports a unilinear or trilinear array (for monochrome and color respectively) of microtips that rest on cathode columns. In a unilinear array, more than one row of arrays may be contained. Gate lines, orthogonally disposed relative to the cathode columns are located at the top level of the microtips and have openings through which the microtips can emit electrons, due to field emission, which bombard nearby conductive phosphor layers, thereby emitting light. Microtips and phosphor layers are placed close together so that proximity focusing of the electrons is adequate. This allows the print head to be placed close to the surface of a rotatable photosensitive drum.

BRIEF DESCRIPTION OF THE DRAWINGS

FIG. 1 is a schematic representation of a LED based photoprinter of the prior art.

FIG. 2 is a closeup view of the LED light source seen in FIG. 1.

DESCRIPTION OF THE PREFERRED EMBODIMENTS

Figure 3:
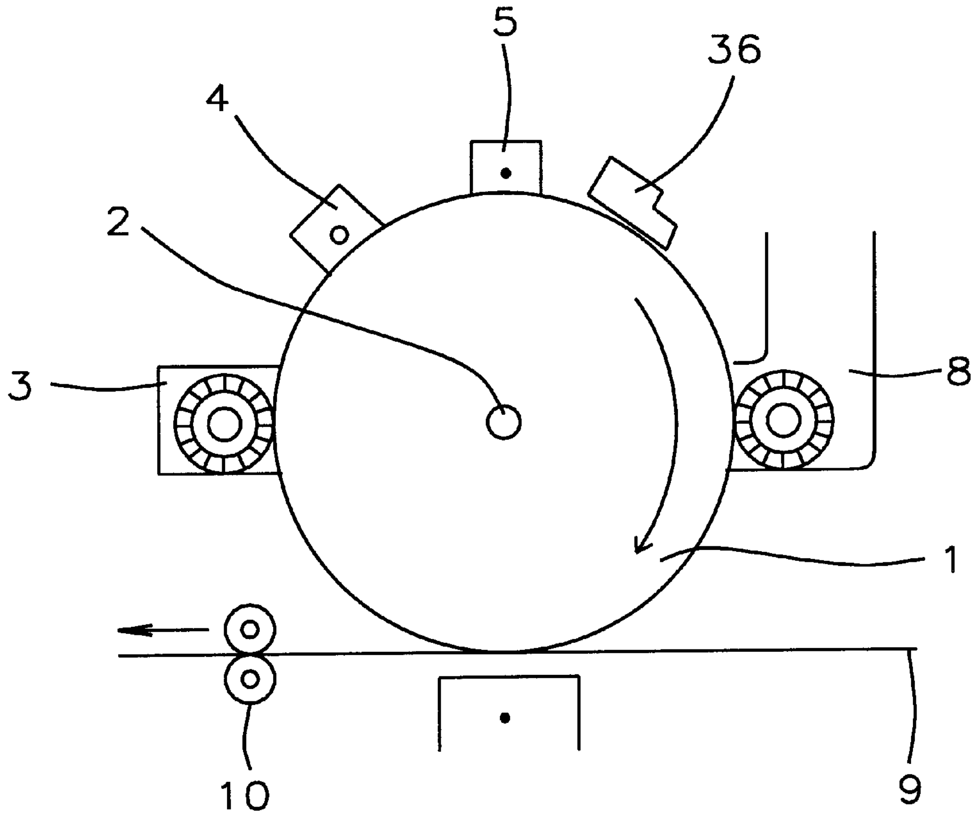
FIG. 3 is a schematic view of a FED based photoprinter as taught by the present invention.

Referring now to FIG. 3, we show there a schematic representation of a photoprinter similar in many respects to the photoprinter shown earlier in FIG. 1. A key departure from the prior art is the incorporation of FED 36 as the print head which is placed in the same position as print head 6 in FIG, 1. The face plate of the FED can have a micro-lens built into it to remove the need for separate focusing means.

Figure 4:
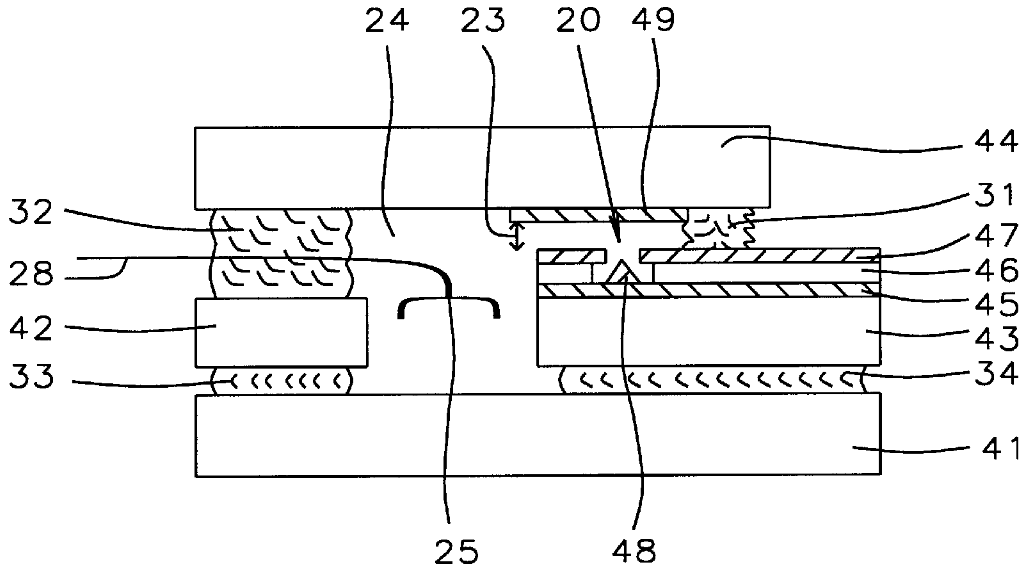
FIG. 4 is a schematic cross-section of the FED print head, intended for monochrome use.

A first embodiment of the FED based print head, intended for monochrome printers, is seen as a schematic cross-section in FIG. 4. It includes the basic elements of a typical cold cathode display, but has three, rather than two, insulating substrates. These are top substrate 44 (between about 0.7 and 2 mm. thick) and bottom substrate 41 (between about 0.7 and 2 mm. thick) as well as middle substrates 42 (on the left) and 43 (on the right). Left middle substrate 42 is between about 0.7 and 2 mm. thick and is about one quarter the width of bottom substrate 41. Right middle substrate 43 (same thickness as 42) is about half the width of substrate 41. By aligning substrate 42 with the left side, or edge, of 41 and aligning 43 with the right side of 41, cavity, or void, 24 is formed (once top substrate 44 is in place). The print head is held together by vacuum-tight seals 31, 32, 33, and 34 which comprise fired glass frit. The glass frit may be mixed with glass beads to help set up the gap between the phosphor and the gate metal.

Metallic line 45, which will serve as a cathode column, is formed on the surface of insulating right middle substrate 43. At regular intervals along said cathode column, microtips such as 48 have been formed. These are typically cones of height about one micron and base diameter about one micron and comprise molybdenum or silicon, though other materials may also be used.

Metallic lines 47 have been formed at right angles to the cathode column, intersecting it at the locations of the microtips. A layer of insulation 46 supports lines 47, which are generally known as gate lines, placing them at the top level of the microtips, that is at the level of the apexes of the cones 48. Openings 20 in the gate lines 47, directly over the microtips, allow streams of electrons to emerge from the tips when sufficient voltage is applied between the gate lines and the cathode column. Because of the local high fields right at the surface of the microtips, relatively modest voltages, of the order of 100 volts are sufficient.

After emerging through the openings 20 in the gate lines, electrons are further accelerated so that they strike conductive phosphor screen 49 where they emit visible light. Said phosphor screen is located a separation distance 23 from the cold cathode assembly. Since the design relies on proximity focusing, that is there is no focusing electrode between the gate line and the phosphor screen, separation distance 23 needs to be as small as possible, without being so close as to introduce other problems such as electrical breakdown, interference with the need to fully and permanently evacuate the region between layers 47 and 49, etc. In practice we have used a distance of about 20 microns, but any distance between about 10 and 100 microns would still work.

The typical values for separation distance 23 quoted above are less than would normally be used because of the already cited problem of fully and permanently evacuating the region between layers 47 and 49. A solution to this problem is one of the features of the present invention. In designs of the prior art, a wider separation distance than 23 is used so as to make evacuation easier and, particularly, to leave room for the inclusion of some sort of gettering means to improve and maintain the vacuum after the system has been permanently sealed. Usually, if the separation distance exceeds 100 microns, focussing means are required for the emitter array in order to keep the spot size at the phosphor small enough.

By adding cavity 24 to the design, space is provided for the inclusion of gettering means 25. Said gettering means consists of a tungsten filament coated with a blend of $BaAl_4$ alloy and nickel powder which gets heated to 800–1,000° C. It includes external contacts 28 which allow the gettering system to be activated after the system has been permanently sealed. Activation involves joule heating of 25 till it evaporates and deposits a layer on the inside walls of 24. Said layer (not explicitly shown) will react with any residual gas molecules that remain inside the print head after sealing, including molecules that materialise as a result of later out-gassing.

Figure 5:
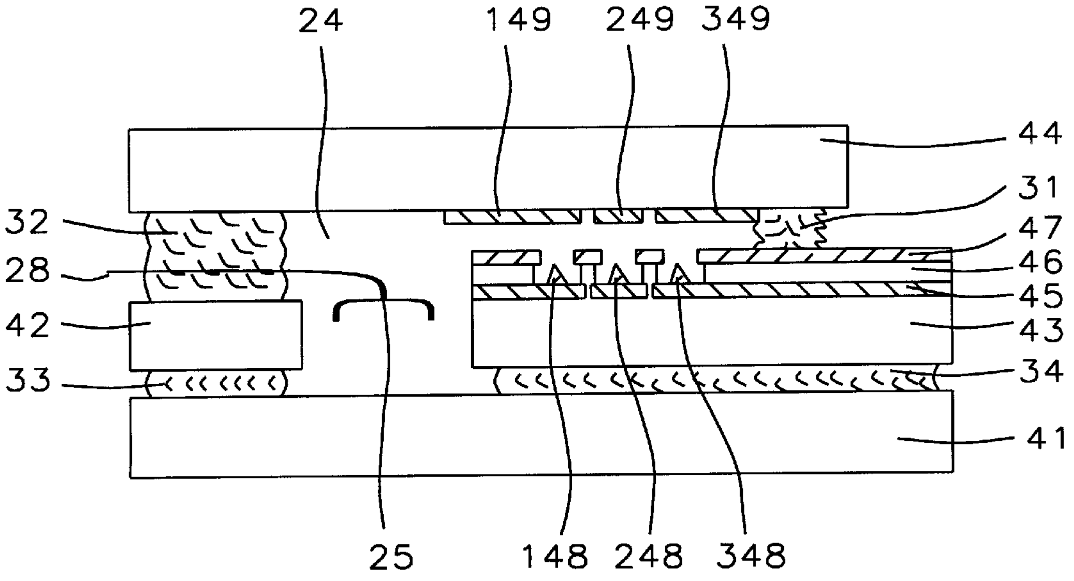
FIG. 5 is a schematic cross-section of the FED print head, intended for color use.

A second embodiment of the present invention, intended for use with color printers, is shown in FIG. 5. The various parts of the structure are the same as already seen in FIG. 4 except that the microtips now comprise a trilinear array, that is three rows of microtips (directed at right angle to the plane of the figure) on three separate cathode columns. Examples of these are microtips 148, 248, and 348. Corresponding to these are three different phosphor layers 149, 249, and 349 respectively. Said phosphor layers are selected to emit one of the primary colors. For example 149 might emit blue light, 249 green light, and 349 red light, any such combination being acceptable. It is important to note that neither FIG. 4 nor FIG. 5 is drawn to scale so that the external dimensions of the (real) print head seen in FIG. 5 is the same as that shown in FIG. 4, the additional width taken up by the two added microtips being less a millimeter.

We now describe a process for manufacturing a monochrome, FED based print head such as the one shown in FIG. 4. Metallic layer 45 is deposited onto the upper surface of right middle substrate 43 and is patterned and etched to form cathode columns. Dielectric layer 46 is then deposited followed by the deposition of metallic layer 47 which is then patterned and etched to form gate lines running at right angles to said cathode column. Openings 20 are then formed in both gate lines 47 and dielectric layer 46, down to the level of 45, wherever the gate lines and the cathode columns overlap each other. A linear array of microtips is then formed, one microtip per opening. Said linear array runs at right angles to the plane of the figure, beween the two ends of the print head. The tips are small enough so that one pixel can contain many tips, thereby increasing the total electron current emitted per pixel.

Next, the three phosphor layers 49 are deposited over three conductive layers, such as indium-tin-oxide (ITO) on the lower surface of top substrate 44 which is then positioned to be parallel to middle substrates 42 and 43. Cavity 24 is between substrates 42 and 43 and serves to hold gettering means 25. Vacuum tight seals 31, 32, 33, and 34 are then used to make this arrangement of the substrates permanent, external contacts 28 to gettering means 25 being passed through seal 32. The assemblage is now sealed using a conventional tube sealing process similar to that used for cathode ray tubes. After sealing, the vacuum level inside the cavity is usually about $10^{-5}$ torr. Finally, gettering means 25 is activated by applying sufficient power to evaporate the getter (around 800–1,000° C.), the vacuum level then reaching about $10^{-7}$ torr.

The manufacturing process for a color print head, such as the one shown in FIG. 5, is similar to that described above but includes the additional steps of depositing three different phosphor layers (149, 249, and 349 in FIG. 5) corresponding to microtips such as 148, 248, and 348 in three separate linear arrays.

While the invention has been particularly shown and described with reference to the preferred embodiments thereof, it will be understood by those skilled in the art that various changes in form and details may be made without departing from the spirit and scope of the invention.

What is claimed is:

1. A field emission based print head comprising:

a front end and a back end;

a bottom substrate, having upper and lower surfaces and left and right sides;

a first middle substrate, having upper and lower surfaces, left and right sides, about one quarter the width of said bottom substrate, vacuum-tight sealed by suitable means to the top surface of said bottom substrate so that their left sides are in alignment;

a second middle substrate, having upper and lower surfaces and left and right sides, about one half the width of said bottom substrate, sealed by suitable means to the top surface of said bottom substrate so that their right sides are in alignment;

a cathode column on the upper surface of said second middle substrate, and a unilinear array of microtips, running from said front end to said back end and resting on said cathode column;

gate lines, orthogonally disposed relative to said cathode column and separated therefrom by a dielectric layer;

openings in said gate lines and said dielectric layer at the overlaps between the gate lines and the cathode column, one of said microtips being located in each of said openings;

a top substrate, about three quarters the width of said bottom substrate, having upper and lower surfaces and left and right sides;

a phosphor layer over a conductive layer on the lower surface of said top substrate where said top substrate overlies said microtips;

A vacuum tight seal between the left and right sides of the top substrate and the upper surfaces of said first and second middle substrates such that the left sides of the top substrate and the first middle substrate are in alignment and there is a separation distance between said phosphor layer and said gate lines;

a cavity, bounded at its top by the lower surface of the top substrate, at its bottom by the upper surface of the bottom substrate, and at its sides by said middle substrates, said cavity being in a state of permanent evacuation; and activated gettering means, located inside said cavity.

2. The print head of claim 1 wherein the thickness of the top substrate is between about 0.7 and 2 mm.

3. The print head of claim 1 wherein the thickness of the middle substrates is between about 0.7 and 2 mm.

4. The print head of claim 1 wherein the thickness of the bottom substrate is between about 0.7 and 2 mm.

5. The print head of claim 1 wherein the separation distance between said phosphor layer and said gate lines is between about 10 and 100 microns.

6. The print head of claim 1 wherein the vacuum-tight seal further comprises glass frit and glass beads.

7. The print head of claim 1 wherein the state of permanent evacuation of said cavity further comprises a residual pressure no greater than about $10^{-6}$ torr.

8. The print head of claim 1 wherein said activated gettering means further comprises a layer of $BaAl_4$ alloy and nickel, formed on the inside of said cavity after said cavity had been permanently evacuated.

* * * * *